March 31, 1942. J. L. ANDERSON 2,277,658
APPARATUS FOR ACCUMULATING AND CONTROLLING LOOPS IN CONTINUOUS STRIPS
Filed March 20, 1940
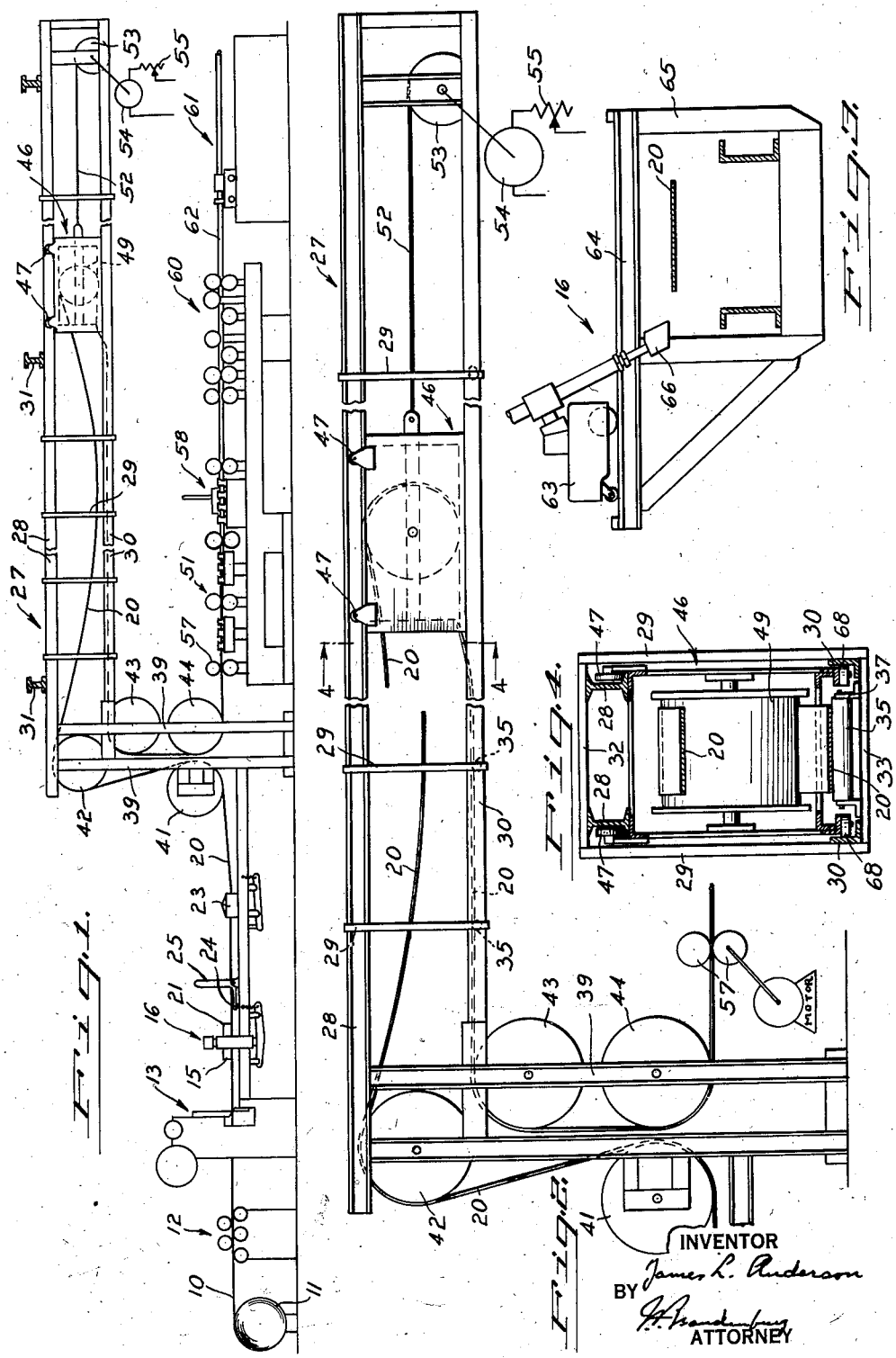
INVENTOR
James L. Anderson
BY
ATTORNEY Patented Mar. 31, 1942

2,277,658

UNITED STATES PATENT OFFICE 2,277,658

APPARATUS FOR ACCUMULATING AND CONTROLLING LOOPS IN CONTINUOUS STRIPS

James L. Anderson, Closter, N. Y., assignor to Air Reduction Company, Incorporated, New York, N. Y., a corporation of New York Application March 20, 1940, Serial No. 324,974

5 Claims. (Cl. 271—2.1)

This invention relates to apparatus for supplying an endless strip to a machine or mill that operates continuously.

A continuous supply of endless strip is required for some tube forming and welding machines, and for certain strip rolling apparatus. This invention is intended primarily for tube welding installations but is not limited to such use. In its broadest aspects, it is an object of the invention to provide improved apparatus for supplying endless strip material continuously to any consuming apparatus which requires a continuous supply.

A more specific object of the invention is to provide an improved apparatus for accumulating a length, preferably a loop, of strip between the consuming apparatus and cross-seam welding equipment that intermittently connects new lengths of material to the strip. The loop is a reserve supply of strip that is used to feed the consuming apparatus while the end of the strip is stopped for connecting a new length of material. Between the times that successive lengths of material are connected with the strip, the length of the loop must be increased to include at least as much strip as is required by the consuming apparatus during the period of time required for the next connecting operation.

In accordance with one feature of the invention strip material, between cross-seam welding apparatus and a continuous forming mill or other consuming apparatus, is subjected to a constant deflecting force that builds up a loop in the strip while the strip is free to move from the cross-seam welding apparatus. The magnitude of the deflecting force is less than the tractive effort of the feed rolls of the forming mill, however, so that when the end of the strip is stopped at the cross-seam welding equipment, the feed rolls continue to advance the strip in the forming mill and no change or adjustment of the deflecting force is necessary.

Other objects, features, and advantages of the invention will appear or be pointed out as the specification proceeds.

In the accompanying drawing, forming part hereof:

Fig. 1 is a diagrammatic view showing a tube making mill embodying the invention;

Fig. 2 is an enlarged scale view of part of the apparatus shown in Fig. 1;

Fig. 3 is an enlarged view of the cross-seam welding apparatus of Fig. 1; and

Fig. 4 is a sectional view taken on the line 4—4 of Fig. 2.

A coiled length of skelp or strip material 10 from a roll 11 is moved through leveling rolls 12 to a power shear 13 which is used to trim the forward and rearward end of each length of material to a uniform straight edge. After having its forward end sheared, each new length of material 10 is advanced through the shear 13 and brought into a clamp 15 which holds the forward end of the new length while cross-seam welding apparatus 16 welds the new length of material 10 to the rearward end of a supply strip 20, held under the welding apparatus by a clamp 21.

After the new length has been welded to the supply strip, and the supply strip has been fed forward until the rearward end of the coil 11 approaches the cross-seam welding equipment 16, a clamp 23 is operated to grip and stop the supply strip and a roller 24 on a bell crank 25 is operated to deflect the strip and bring its rearward edge into exact position under the cross-seam welding apparatus 16. The forward edge of a new coil of material is sheared and brought into abutment with the rearward clamped edge of the supply strip and then clamped in position by the clamp 15.

Beyond the holding clamp 23 the strip passes to the loop accumulator which includes a long overhead cage 27 comprising I-beams 28, side members 29, and bottom angles 30. The I-beams are supported by trusses 31 of the building in which the cage is housed. There are tie rods 32 (Fig. 4) connected to and resting upon the I-beams 28. These tie rods are attached to the side members 29. The lower ends of the side members are connected by tie rods 33 that extend under and support the bottom angles 30.

Conveyor rollers 35 have axles supported by brackets 37 fastened to the tie rods 33. Uprights 39 (Fig. 1) extend from one end of the cage 27 to the floor. These uprights support several rolls 41—44 over which the strip passes at the regions where it changes its direction of travel. These rolls 41—44 are of large diameter in order to avoid sharp bends in the strip.

The strip 20 passes under the roll 41 and then upward and over the roll 42, after which the strip passes forward lengthwise along the cage 27. A carriage 46 in the cage 27 has wheels 47 that run on the lower inside flanges of the I-beams 28 as rails. The strip 20 passes around a large diameter roll 49 that is carried by the carriage 46 and then back lengthwise along the cage 27 in contact with the conveyor rollers 35, as shown in Fig. 2. The strip 20 turns downward over the roll 43 and then around the roll 44 and forward to a forming mill 51.

A cable 52 attached to the carriage 46 is wrapped around a winch 53 driven by a torque motor 54. There is a rheostat 55 in the motor circuit for adjusting the torque of the motor and the resulting constant pull of the carriage 46 on the strip 20. Except when the carriage 46 is near the rearward end of its track and the upper run of strip 20 between the roll 42 and carriage-supported roll 49 is short, the weight of the strip 20 causes the upper run between these rolls 42 and 49 to sag and at times contact with the lower run of the strip 20 which rests on the conveyer rollers 35.

Unless the strip 20 is held by one of the clamps 21 or 23, the torque motor 54 will cause the carriage 46 to pull the loop toward the front end of the cage 27 and increase the length of the loop until the carriage comes against the end of the cage which limits the loop to a given maximum length. The strip then passes progressively over the rolls 41, 42, 49, 43, and 44 to feed rolls 57 of the forming mill 51 without any further increase in the length of strip between the cross-seam welding equipment and the forming mill.

The tractive effort of the feed rolls 57 is greater than the pull of the carriage 46 on the supply strip so that whenever the end of the supply strip is stopped for the purpose of connecting a new length, the feed rolls 57 continue to advance the strip at the same rate as before and the carriage 46 is pulled back (to the left in Figs. 1 and 2) in spite of the force of the torque motor 54.

The length of the loop is sufficient to supply the feed rolls 57 during the time required to connect a new length of material to the supply strip. As soon as the new length is connected and the clamps 21 and 23 are released, the torque motor will again accumulate a maximum length of loop by pulling the carriage 46 to the end of the cage 27.

Beyond the forming mill 51 the strip material passes through a tube welding machine 59, and then through sizing and straightening roll passes 60 and to a motor-driven cut-off machine 61 that cuts the continuous tube 62 to the desired lengths.

Fig. 3 shows a self-propelled torch carriage 63 that runs on a track 64 located above and extending transversely of the strip 20. The track 64 is supported by a frame 65 that is part of the same frame on which the clamps 16, 21, and 23 (Fig. 1) are mounted. A welding torch 66 (Fig. 3) is attached to the carriage 63 and is moved by the carriage along the seam between the abutting end faces of the supply strip 20 and a new length of material that is to be connected to the supply strip. The structure shown in Fig. 3 is merely representative of equipment for connecting new lengths of material to a supply strip and other equipment for the purpose can be used.

Fig. 4 shows the construction of the carriage 46 with its supporting wheels 47 running on the I-beam 28 as a track. Guide rollers 68 at the lower end of the carriage rotate on vertical axes and contact with the sides of the guide angles 30 to prevent the carriage 46 from swaying in the cage.

The preferred embodiment of the invention has been described, but changes and modifications can be made and some features of the invention can be used without others.

I claim:

1. In or for strip welding apparatus, a loop-accumulating and control device including a roller rotatable about a horizontally-extending axis and around which a strip passes with a reverse bend, a carriage on which said roller is supported, horizontally extending guides on which the carriage moves, an end roll over which an upwardly extending run of strip passes to enter the frame, another end roll over which the strip passes to leave the frame after looping around the roller on the carriage, both of said end rolls being rotatable about horizontal axes and at least one of said end rolls being in position to support a run of strip that sags between that end roll and the carriage-supported roller, yieldable means urging the carriage to move toward the end of the guides remote from said end rolls with a force insufficient to remove all of the sag from the sagging run of strip, and other rolls under said end rolls about which the strip passes from and to generally horizontal runs of strip at a level spaced from and below the guides on which the carriage moves.

2. Apparatus for controlling a loop of material between intermittently-operated strip-connecting equipment and a machine to which a continuously-moving supply of strip must be maintained, said apparatus including a horizontally extending frame with beams extending lengthwise of said frame, a carriage with wheels that run along the horizontal frame beams as a track, a roll journaled in the carriage and rotatable about a substantially horizontal axis, an end roll over which a strip enters the frame, another end roll over which the strip leaves the frame after passing around the roll on the carriage, other rolls under the end rolls including a roll about which strip moving horizontally from the connecting equipment turns upward to one of the end rolls, and another roll about which strip moving downward from the other end roll turns to a generally horizontal run to said machine, a winch at the end of the frame, a cable connected with the carriage and wrapped around the winch for pulling the carriage along the horizontal track in a direction away from the end rolls to increase the length of loop within the frame, a torque motor connected with the winch for maintaining a constant tension on the cable to the carriage, and adjustable means for controlling the torque developed by the motor.

3. Apparatus for accumulating a loop in a continuous strip from between two substantially alined, generally horizontal runs of the strip with the use of a minimum of space at the level of said horizontal runs, said apparatus comprising lower rolls around which upwardly and downwardly extending runs of the strip turn from and to said horizontal runs, upper rolls at an elevated level above said lower rolls and around which the upwardly and downwardly extending runs turn to and from a horizontally extending loop, a horizontal frame located at an elevated level spaced above one of said horizontal runs of strip, a carriage movable along the frame toward and from said upper rolls, a roller on the carriage around which the strip passes with a reverse bend to form the horizontally extending loop, and means urging the carriage along the horizontal frame toward the end of the frame away from the upper rolls to accumulate a longer length of strip.

4. Apparatus for accumulating and controlling a loop of strip material that is supplied intermittently along a horizontal run from a strip-connecting machine located at a floor level, and that is fed forward continuously along another horizontal run to a strip-working machine located at floor level and in substantial alinement with the horizontal run of strip from the strip-connecting machine, said apparatus including a long horizontal frame supported at an elevated level above one of said machines and vertically spaced from the machine, but extending lengthwise generally parallel to the direction of travel of the horizontal runs of strip, a carriage that moves along the frame, a roller supported by the carriage for rotation about a horizontal axis and around which the strip passes to form a loop, a roll around which the horizontal run of strip from the strip-connecting machine turns to an upwardly extending run, an adjacent roll around which a downwardly extending run of the strip turns to form the horizontal run to the strip-working machine, a roll at one end of the frame around which the upwardly extending run passes to the carriage-supported roller, another roll at the end of the frame around which strip that has looped around said carriage-supported roller passes to the downwardly-extending run, and means for moving the carriage along the frame away from the rolls at the end of the frame to increase the length of the loop.

5. Apparatus for accumulating and controlling a loop of strip from between an intermittently movable, generally horizontal run of strip and a continuously moving, generally horizontal run of the same strip, said apparatus including a first roll about which the intermittently movable run of strip turns upward, a second roll above the first roll and around which the upwardly extending run of the intermittently movable strip turns to a horizontal run at an elevated level, a roller around which the strip from the second roll passes with a reverse bend to form a loop, a carriage on which the roller is supported for rotation about an axis parallel to the axis of the first and second roll, horizontally extending guides along which said carriage is movable to displace the roller horizontally at said elevated level toward and from said second roll, a third roll at the same end of the guides as the second roll and around which the run of strip from the carriage-supported roller turns downward, and a fourth roller below the third roller for turning the downwardly extendnig strip horizontally to the continuously-moving run.

J. L. ANDERSON.